(12) United States Patent
Lin

(10) Patent No.: US 7,065,899 B2
(45) Date of Patent: Jun. 27, 2006

(54) GAS HOT AIR GUN

(76) Inventor: Arlo Lin, Akara Building, 24 de Castro Street, Wickhams Cay I, Road Town, Tortola (VG)

( * ) Notice: Subject to any disclaimer, the term of this patent is extended or adjusted under 35 U.S.C. 154(b) by 0 days.

(21) Appl. No.: 10/899,701

(22) Filed: Jul. 26, 2004

(65) Prior Publication Data

US 2006/0016091 A1    Jan. 26, 2006

(51) Int. Cl.
   *A45D 20/12*    (2006.01)
(52) U.S. Cl. .......................................... 34/97; 392/384
(58) Field of Classification Search .................... 34/97; 392/384
   See application file for complete search history.

(56) References Cited

U.S. PATENT DOCUMENTS

| 4,995,171 A | * | 2/1991 | Yoshinaga et al. ............. 34/97 |
| 5,155,925 A | * | 10/1992 | Choi ............................. 34/97 |
| 5,608,975 A | * | 3/1997 | Hsu ............................. 34/97 |
| 5,857,262 A | * | 1/1999 | Bonnema et al. .............. 34/97 |

FOREIGN PATENT DOCUMENTS

TW    83795    12/1986

\* cited by examiner

*Primary Examiner*—S. Gravini
(74) *Attorney, Agent, or Firm*—Alan D. Kamrath; Nikolai & Mersereau, P.A.

(57) ABSTRACT

A gas hot air gun includes a main body, an air blower, an ignition device, a nozzle and a switch set. The main body includes a barrel, a handle, a heating chamber and a mixing chamber on the inner front of the barrel. A battery set and a gas can are inside the handle. One end of the nozzle is connected to the gas can. The switch set includes a power switch and an ignition switch. Users press the power switch and have gas spray out from the nozzle into the heating chamber to generate heat. The blower sends out hot air in the heating chamber out of the main body. A metal slice to regulate the direction of air and a catalyst to avoid flames from coming out of the nozzle area are inside the heating chamber.

20 Claims, 7 Drawing Sheets

GAS HOT AIR GUN

BACKGROUND OF THE INVENTION

1. Field of the Invention

This invention relates generally to a hot air gun and, more specifically, to a gas hot air gun that offers smaller physical size for users to carry around, complete burn of gas to reduce carbon mono-oxide and faster cooling down of the whole set after application to prevent users from danger of burning.

2. Description of the Prior Art

Heretofore, it is known that the "Internal structure of a hot air gun" of Taiwan Publication no. 83795 comprises a shell body 1, a hot air pipe pedestal 2, an insulated ceramic pedestal 3, an air pipe 4 and an air blower 5. The shell body 1 contains all the above components. An electrical heating coil 6 externally wraps around the hot air pipe pedestal 2. The combination is inserted into the insulated ceramic pedestal 3. The air pipe 4 is installed outmost and fixed internally onto the shell body 1. The electrical heating coil 6 generates high temperature air. The air blower 5 blows the hot air out through the air pipe 4.

In real application, the known hot air guns still have many drawbacks. Since they need a power core to plug into the wall power to have the electrical hot wire 6 generate hot air, they are not easy to carry. If users apply the hot air gun outdoors, power plugs sometimes are not available. A power generator is needed. The electrical heating coil 6 remains hot after application so that users can not pack the hot air gun up right away. Users might get burned carelessly often. The design of known hot air guns is not very safe, is not very practical and needs improvement.

SUMMARY OF THE INVENTION

It is therefore a primary object of the invention to provide a gas hot air gun that improves known hot air guns applying AC power to generate heat with an electrical heating coil and that offers smaller physical size for users to carry around, complete burn of gas to reduce carbon mono-oxide and faster cooling down of the whole set after application to prevent users from danger of burning.

In order to achieve the objective set forth, a gas hot air gun in accordance with the present invention comprises a main body, an air blower, an ignition device, a nozzle and a switch set. The main body comprises a barrel, a handle, a heating chamber and a mixing chamber on the inner front of the barrel. A battery set and a gas can are inside the handle. One end of the nozzle is connected to the gas can. The switch set comprises a power switch and an ignition switch. Users press the power switch and have gas spray out from the nozzle into the heating chamber to generate heat. The blower sends out hot air in the heating chamber out of the main body. A metal slice to regulate the direction of air and a catalyst to avoid flames from coming out of the nozzle area are inside the heating chamber. The present invention is small in size and easy for users to carry.

BRIEF DESCRIPTION OF THE DRAWINGS

The accomplishment of the above-mentioned object of the present invention will become apparent from the following description and its accompanying drawings which disclose an illustrative embodiment of the present invention, and are as follows.

DESCRIPTION OF THE PREFERRED EMBODIMENT

Figure 1:
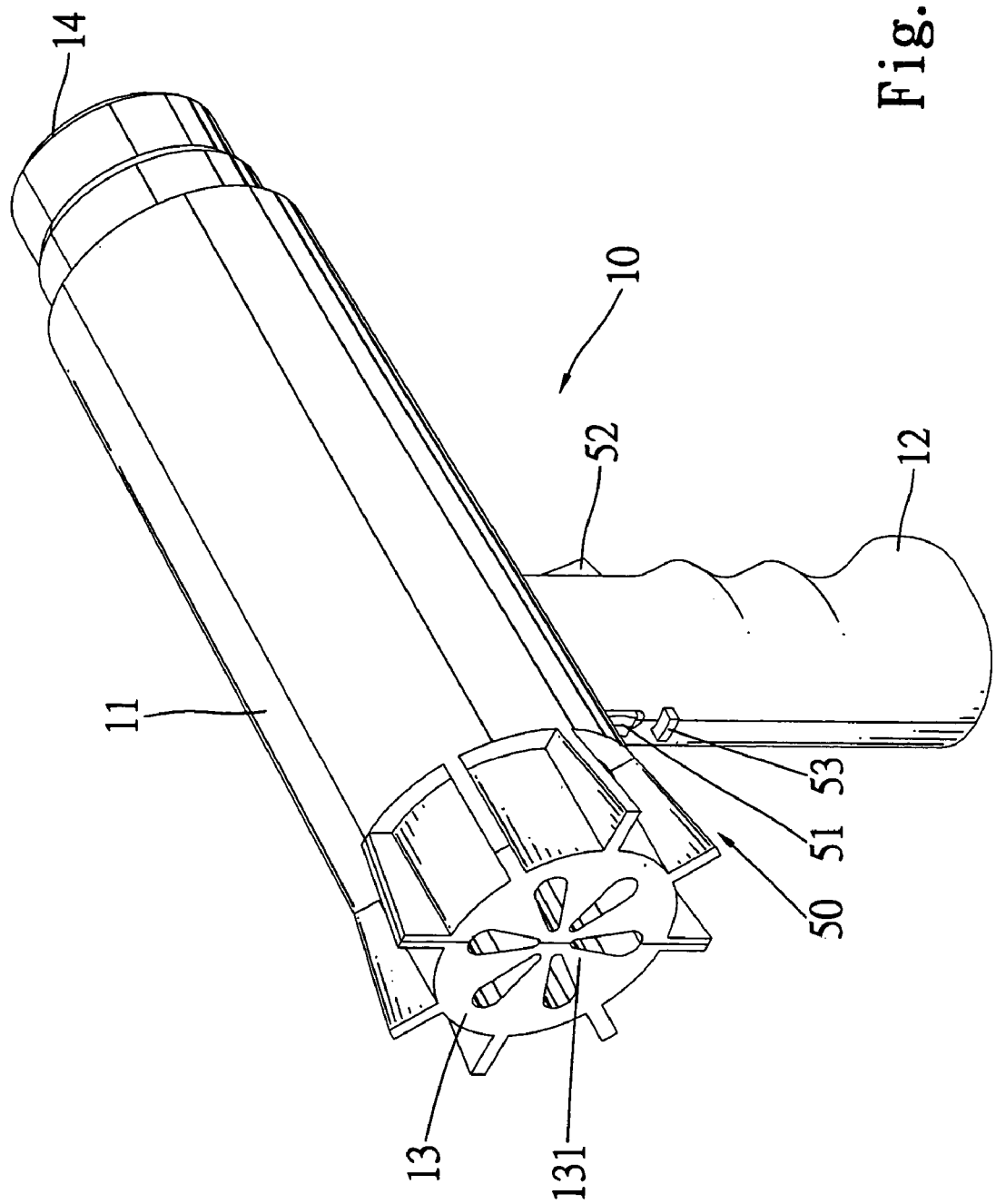
FIG. 1 is a perspective view of the present invention.
Figure 2:
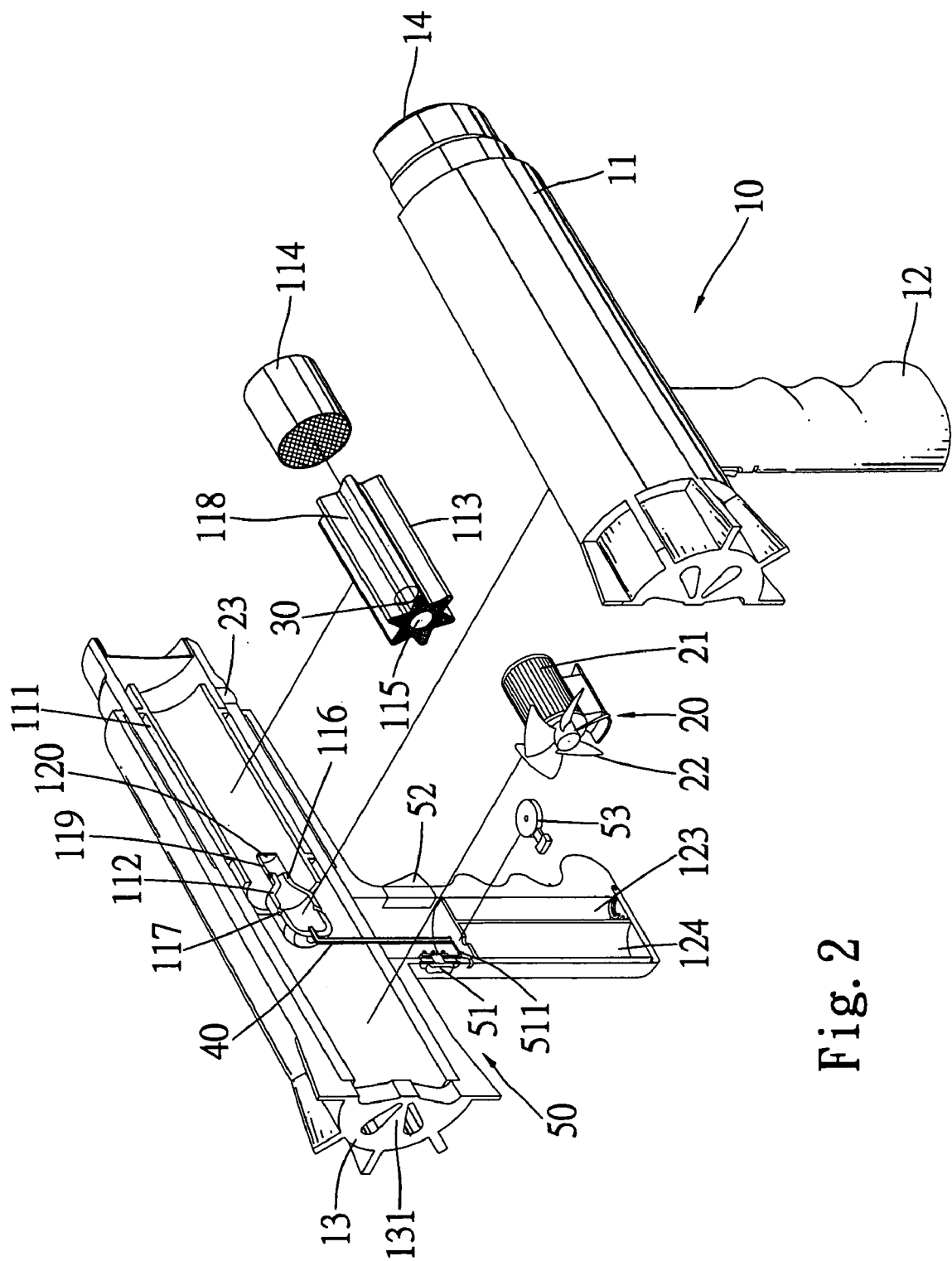
FIG. 2 is an assembly view of the present invention.
Figure 3:
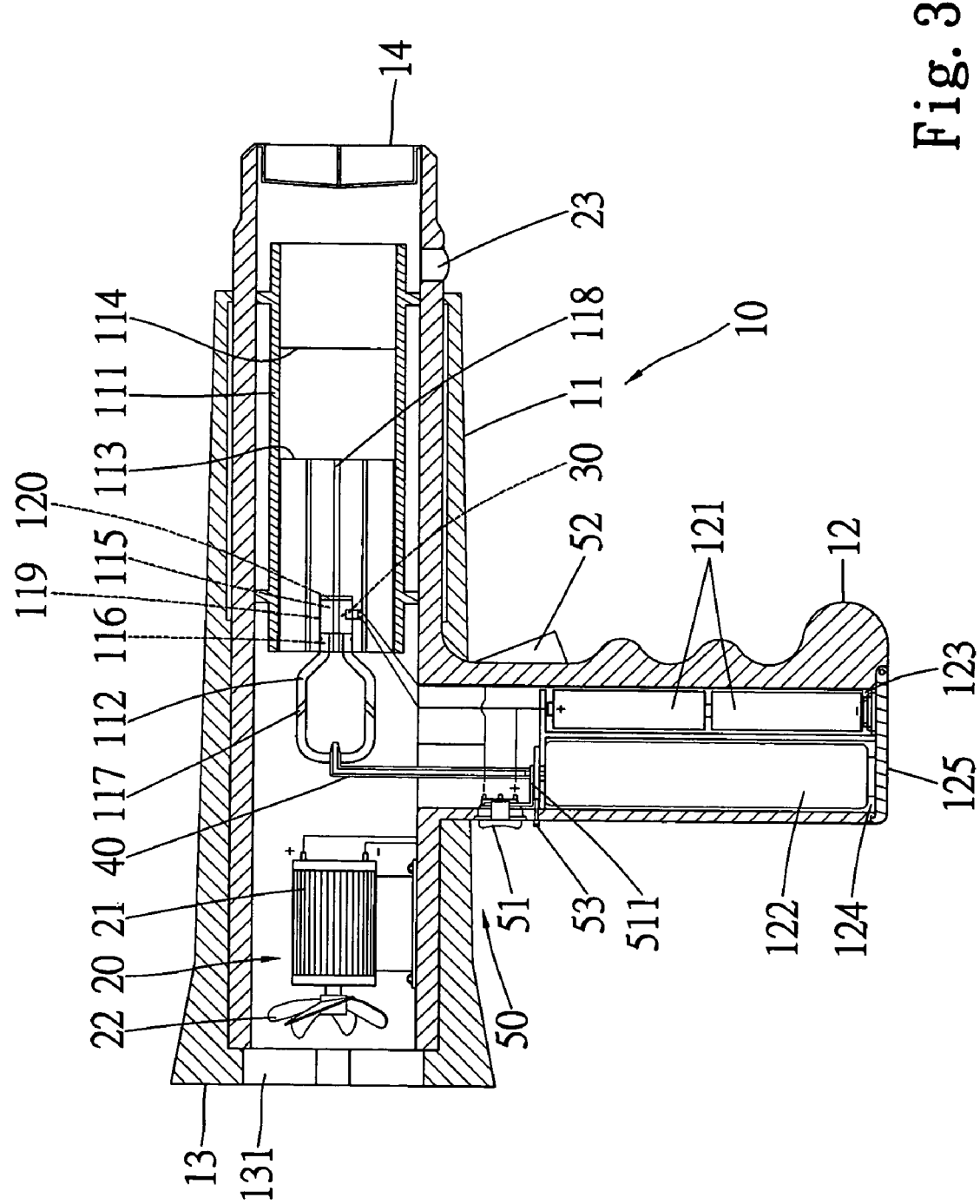
FIG. 3 is a cross-sectional view of the present invention.

Referring to FIG. 1 to FIG. 3, the present invention comprises a main body 10, an air blower 20, an ignition device 30, a nozzle 40 and a switch set 50. The main body 10 consists of a barrel 11 and a handle 12. A heating chamber 111 is inside the barrel 11. A gas can 122 is inside the handle 12. Users can press the switch set 50 to have the gas of the gas can 122 spray out from the nozzle 40 into the heating chamber 111. The ignition device 30 ignites the gas inside the heating chamber 111 to generate a heat source. The air blower 20 blows the hot air inside the heating chamber 111 externally to the main body 10.

The main body 10 further comprises an intake 13 and a exhalation hole 14. A heating chamber 111 and a mixing chamber 112 are on the inner front of the barrel 11. A daisy shape metal slice 113 and a catalyst 114 are inside the heating chamber 111. The metal slice 113 is installed inside the heating chamber 111 near the front side of the barrel 11. The catalyst 114 is installed near the end of the barrel 11. A burning chamber 115 is inside the metal slice 113. The mixing chamber 112 is installed on the barrel 11 opposite to the location of the heating chamber 111. A shrink 116 near the metal slice 113 is formed on one end of the mixing chamber 112. The shrink 116 is interlinked to the burning chamber 115 of the metal slice 113. Several air inhalation holes 117 are around the mixing chamber 112. Passages 118 are between the metal slice 113 and the barrel 11. A tube shaped metal net 119 to control the mixing air flow is installed between the burning chamber 115 of the metal slice 113 and the shrink 116 of the mixing chamber 112. A thicker metal net 120 with smaller net holes near the exhalation hole 14 is on one side of the metal net 119. The handle 12 is connected to and beneath the barrel 11. A first container 123 and a second container 124 are inside the handle 12. A battery set 121 and a gas can 122 are inside the first and the second container 123, 124, respectively The gas can 122 contains burnable fluid, usually liquid gas. A movable cover 125 is on the bottom of the handle 12 to cover the first and the second containers 123, 124. The intake 13 is installed on the end of the barrel 11 for air to flow into the barrel 11. Several protective grids 131 are on the intake 13 to prevent users from inserting their fingers in. The exhalation hole 14 is on the front of the barrel 11 to expel air from the barrel 11.

The air blower 20 is installed internally on the end of the barrel 11 to draw air from the intake 13 into the barrel 11. The blower 20 comprises a motor 21, a fan blade 22 and a temperature sensor 23. The motor 21, a DC motor in this application, is located near one side of the exhalation hole 14. The fan blade 22 is installed on the motor 21 and near one side of the intake 13 to be driven by the motor 21. The temperature sensor 23 is installed around the barrel 11 near the heating chamber 111. The temperature sensor 23 controls the motor 20. After the end of application and when the temperature of the heating chamber 111 is below a certain temperature, the temperature sensor 23 stops the motor 21 from turning.

The ignition device 30 is installed inside the metal slice 113 of the heating chamber 111 to ignite the mixed gas in the heating chamber 111. The ignition device 30 is installed inside the burning chamber 115 of the metal slice 113 in this application.

The nozzle 40 is installed inside the barrel 11 of the main body 10 and located between the air blower 20 and the mixing chamber 112. One end of the nozzle 40 is connected to the gas can 122.

The switch set 50 is installed inside the handle 12 of the main body 10 near the barrel 11. The switch set 50 comprises a power switch 51, an ignition switch 52 and a regulation valve 53. The power switch 51 connects to the battery set 121 and the blower 20 with electrical wires. The power switch 51 also has a control rod 511 to open and close the gas can 122. The ignition switch 52 connects between the battery set 121 and the ignition device 30 with electrical wires. The regulation valve 53 is installed on the gas can 122 to control the gas flow amount of the gas can 122.

Figure 4:
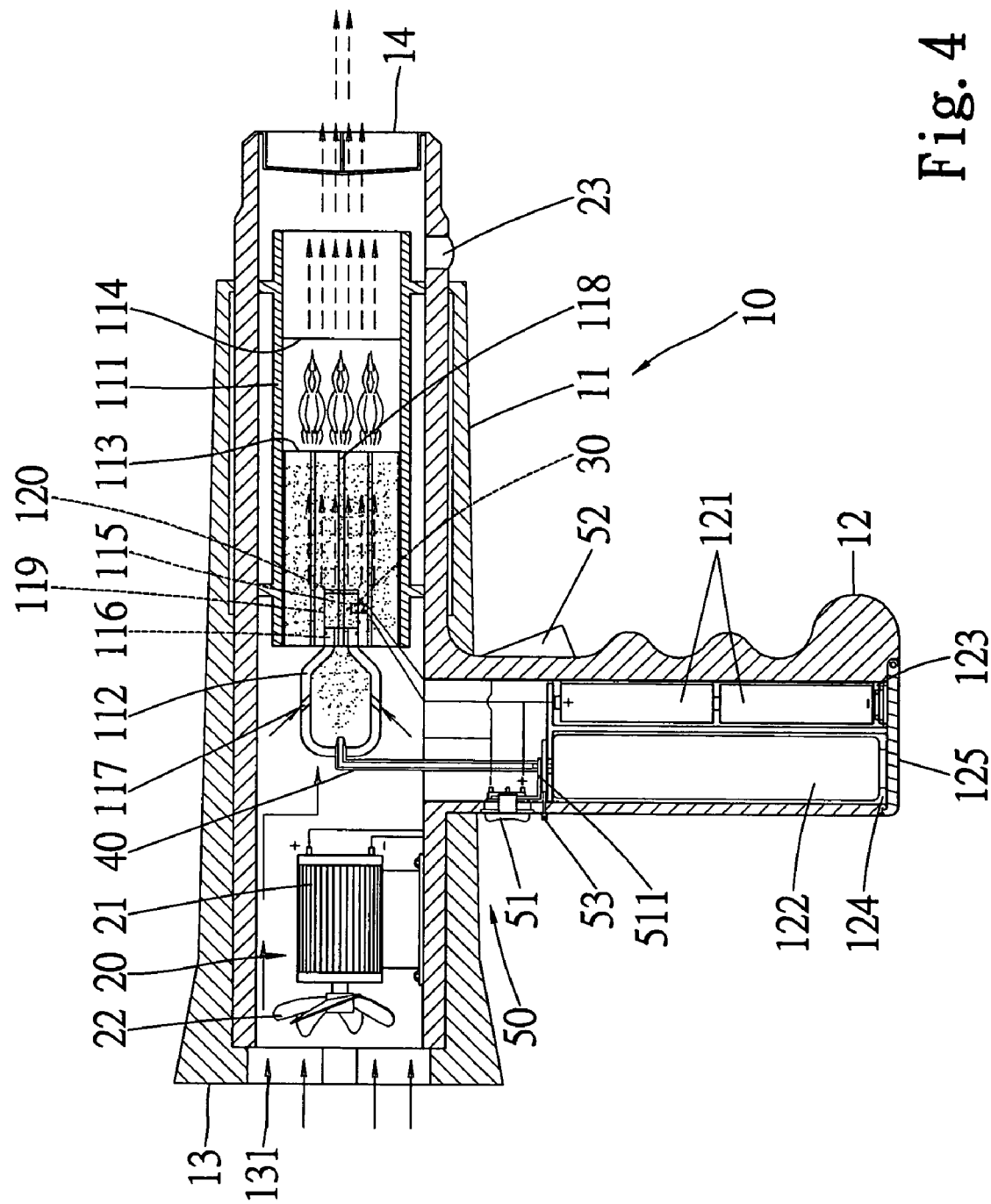
FIG. 4 is an application view of the present invention.
Figure 5:
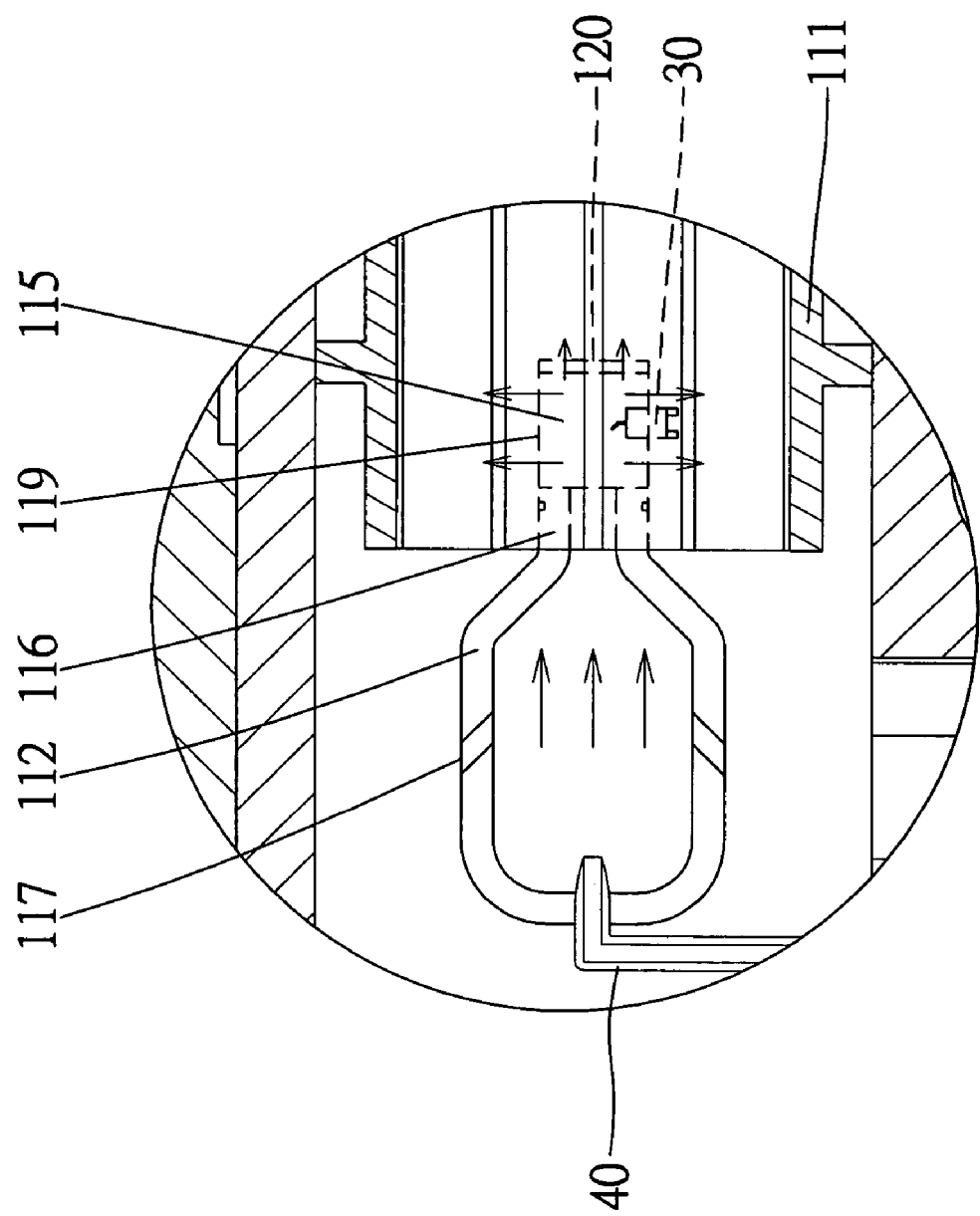
FIG. 5 is a cross-sectional view of a second embodiment of the present invention.

Referring to FIG. 4, when the power switch 51 is pressed on, the control rod 511 opens the gas can 122, and the gas sprays out from the nozzle 40. At the same time, the blower 20 blows air from the intake 13 into the mixing chamber 112 to mix the gas and the air blown in. When the mixed gas passes through the shrink 116 and due to the shrinking diameter of the shrink 116, the mixed gas is compressed so that the mixed air sprays out the shrink 116 at a faster speed. The high speed injected mixed air entering the burning chamber 115 of the metal slice 113 flows to the tube shaped metal net 119 that guides the flow direction of the mixed gas (referring to FIG. 5), which is blocked by the thicker metal net 120 on the front of the tube shaped metal net 119 and the tube shaped metal net 119 itself. Since the net holes of the thicker metal net 120 is smaller, the mixed gas is blocked effectively to have most of the mixed gas sprayed out in all directions. When the ignition switch 52 is pressed, the ignition device 30 ignites the mixed gas and generates the flame forming the first burn. The flame expands several tongues of flames from the burning chamber 115 to surround the metal slice 113 and have the temperature of the metal slice 113 rise gradually. Due to the better heat exchange rate of the metal slice 113 and when the air flow sent by the blower 20 passes through the passages 118 of the metal slice 113, air flow can bring the heat on the metal slice 113 to generate hot air. When the hot air passes through the catalyst 114, the catalyst 114 burns the small quantity of left-over gas to reduce the quantity of carbon monoxide (CO) and that forms the second burning. After two forms of burning, the air temperature is higher, and the air is safer as the catalyst 114 avoids the burning flame in the metal slice 113 from coming out of the nozzle 40.

The mixed gas needs to have a good ratio of fresh air and gas to be properly burnt. When the oxygen contained is too low in the mixed gas, the air inhalation holes 117 around the burning chamber 115 offer fresh air. The diameter of the shrink 116 of the mixing chamber 112 shrinks gradually so that fresh air is sucked in is mixed with gas and enters the burning chamber 115 to be burnt stably. The quantity of gas can also be controlled by the regulation valve 53. Since the metal slice 113 inside the heating chamber 111 has very good heat conductivity, the temperature of the metal slice 113 is lifted rapidly after the ignition inside the burning chamber 115. If the gas in the heating chamber 111 is not burnt properly, toxic carbon monoxide is generated and is harmful to the human body. In order to achieve complete burning, the catalyst 114 can achieve such purpose. Specifically, the catalyst 114 reacts with the burning gas and generates non-toxic carbon dioxide. The catalyst 114 can also prevent the flame from coming out of the nozzle 40.

The temperature sensor 23 connected to the blower 20 is installed on the barrel 11 near the heating chamber 111. When the power switch 51 is turned off, the nozzle 40 stops spraying. The heating chamber 111 stops the burning process but still remains in high temperature condition. The blower 20 can still turn and send fresh air to lower the heating chamber 111 temperature. The metal slice 113 has good heat conductivity to lower the heating chamber 111 temperature with cool air. When the temperature sensor 23 detects the heating chamber 111 reaches a certain cool temperature, the blower 20 is stopped. Thus, the design makes the present invention easier to carry and prevents users from danger of burning.

Figure 6:
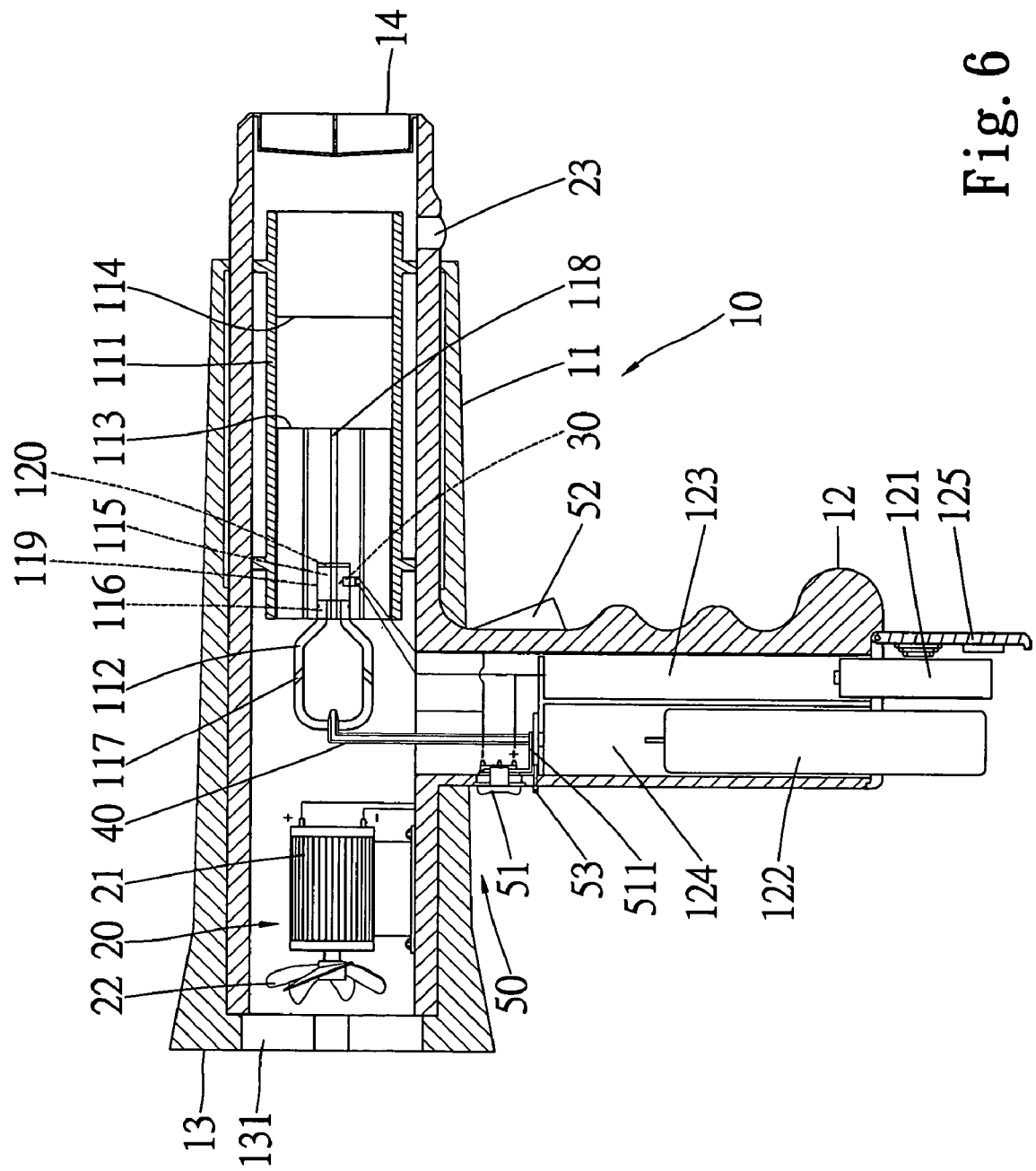
FIG. 6 is another cross-sectional view of a third embodiment of the present invention.
Figure 7:
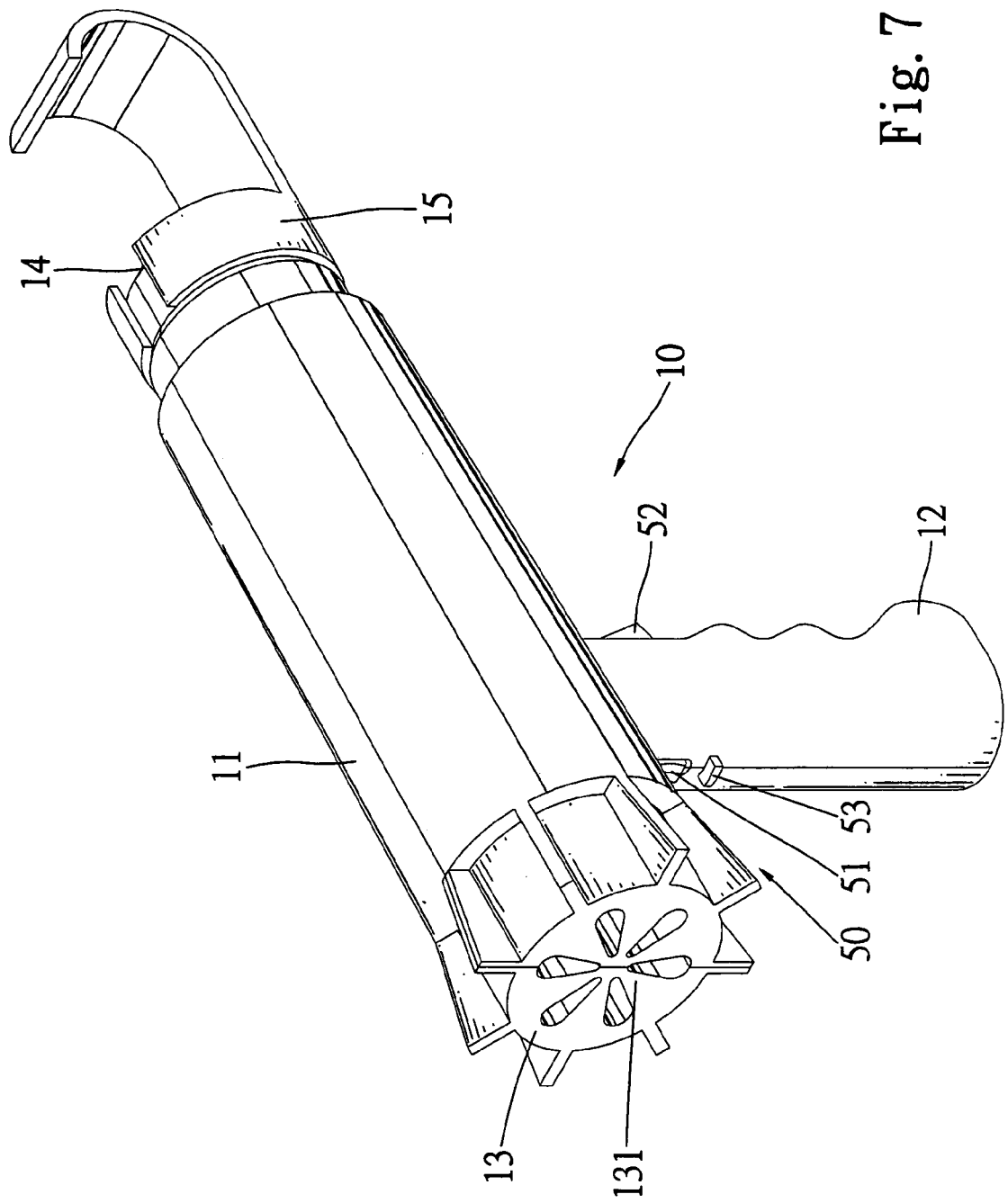
FIG. 7 is a perspective view of a fourth embodiment of the present invention.

Referring to FIG. 6, when either battery set 121 or gas can 122 is out, a new battery set 121 or gas can 122 can be replaced. The replacement is very convenient. Specifically, users only need to lift the removable cover 125 and take the battery set 121 or gas can 122 out from the first or the second container 123, 124, respectively, and do the replacement. The gas can 122 can be the re-fill type. The present invention applies gas to generate high temperature to avoid the troublesome power cord and to reduce the space. Thus, it is very convenient for users to carry the present invention around. Referring to FIG. 7, a holder 15 is installed to hold a tube to be heated for faster heating effect.

Although the invention has been explained in relation to its preferred embodiment, it is to be understood that many other possible modifications and variations can be made without departing from the scope of the invention as hereinafter claimed.

What is claimed is:

1. A gas hot air gun comprising:
   a main body including a barrel and a handle, with a heating chamber and a mixing chamber in said barrel, and a battery set and a gas can inside said handle, wherein the gas can contains burnable fluid;
   an air blower installed internally on an end of said barrel and powered by the battery set;
   an ignition device installed inside said barrel;
   a nozzle installed inside said main body, wherein one end of said nozzle is connected to the gas can to spray gas; and
   a switch set installed inside said main body, said switch set comprises a power switch and an ignition switch, wherein users press said power switch and have gas spray out from said nozzle into said mixing chamber to mix with air which then is sent to said heating chamber, said ignition switch has said ignition device ignite the mixed gas and air and generate a heat source, wherein said blower blows hot air inside said heating chamber out of the barrel, wherein a first and a second container are installed in said handle to hold the battery set in said first container and the gas can in said second container, wherein a movable cover is on a bottom of said handle to cover said first and said second container.

2. The gas hot air gun according to claim 1, wherein several intakes are installed on the end of said barrel for fresh air to come in.

3. The gas hot air gun according to claim 1, wherein a holder is installed on a front of said barrel for faster heating effect.

4. The gas hot air gun according to claim 1, wherein the gas can is a refill type can.

5. The gas hot air gun according to claim 1, wherein said switch set contains a regulation valve.

6. The gas hot air gun according to claim 1, wherein said switch set is installed on said handle of said main body.

7. The gas hot air gun according to claim 1, wherein said power switch connects to the battery set and said air blower with electrical wires, said power switch also has a control rod to open and close the gas can.

8. The gas hot air gun according to claim 1, wherein said ignition switch connects to said ignition device.

9. The gas hot air gun according to claim 5, wherein said regulation valve controls the gas flow amount of the gas can.

10. The gas hot air gun according to claim 1, wherein said heating chamber interlinks to said mixing chamber.

11. The gas hot air gun according to claim 1, wherein said heating chamber is installed on a front of said barrel, said mixing chamber is installed on said heating chamber near the end of said barrel.

12. The gas hot air gun according to claim 1, wherein a shrink is formed in said mixing chamber near said heating chamber, the diameter of said shrink is smaller on an end near said nozzle.

13. The gas hot air gun according to claim 1, wherein several air inhalation holes are around said mixing chamber for fresh air to come in to achieve better gas-air ratio.

14. The gas hot air gun according to claim 1, wherein a metal slice is inside said heating chamber with good heat exchange rate and heat conductivity to be heated up and cooled down rapidly, said metal slice also has an air flow direction regulation effect.

15. The gas hot air gun according to claim 1, wherein a catalyst is installed in said heating chamber to help the mixed gas burn completely and to reduce the generation of carbon monoxide to lift temperature and avoid flame coming out from said nozzle.

16. The gas hot air gun according to claim 14, wherein a burning chamber is installed on one end of said metal slice, said burning chamber interlinks to said mixing chamber.

17. A gas hot air gun comprising:
a main body including a barrel and a handle, with a heating chamber and a mixing chamber in said barrel, and a battery set and a gas can inside said handle, wherein the gas can contains burnable fluid;
an air blower installed internally on an end of said barrel and powered by the battery set;
an ignition device installed inside said barrel;
a nozzle installed inside said main body, wherein one end of said nozzle is connected to the gas can to spray gas; and
a switch set installed inside said main body, said switch set comprises a power switch and an ignition switch, wherein users press said power switch and have gas spray out from said nozzle into said mixing chamber to mix with air which then is sent to said heating chamber, said ignition switch has said ignition device ignite the mixed gas and air and generate a heat source, wherein said blower blows hot air inside said heating chamber out of the barrel, wherein a metal slice is inside said heating chamber with rood heat exchange rate and heat conductivity to be heated up and cooled down rapidly, said metal slice also has an air flow direction regulation effect, wherein a burning chamber is installed on one end of said metal slice, said burning chamber interlinks to said mixing chamber, wherein said ignition device is installed inside said burning chamber.

18. The gas hot air gun according to claim 1, wherein said air blower comprises a motor and a fan blade, said motor located near a front side of said barrel, wherein the fan blade is installed near the end of said barrel.

19. The gas hot air gun according to claim 18, wherein said air blower comprises a temperature sensor, wherein said temperature sensor is installed around said barrel near said heating chamber, said temperature sensor keeps said motor turning after said power switch is off, wherein when the temperature of said heating chamber goes below a certain temperature, said temperature sensor stops said motor from turning.

20. The gas hot air gun according to claim 1, wherein said nozzle is installed in said barrel of said main body between said blower and said mixing chamber.

* * * * *